United States Patent [19]

Furutachi et al.

[11] 4,128,606

[45] Dec. 5, 1978

[54] IMPACT-RESISTANT CHEMICALLY BLENDED PROPYLENE POLYMER COMPOSITION AND PROCESS FOR PREPARATION THEREOF

[75] Inventors: Kunio Furutachi; Akifumi Kato; Mikio Nakagawa, all of Ohtake; Masaru Nakano, Iwakuni; Shunji Arita, Ohtake; Aikich Yamamoto, Yamaguchi, all of Japan

[73] Assignee: Mitsui Petrochemical Industries, Ltd., Tokyo, Japan

[21] Appl. No.: 757,026

[22] Filed: Jan. 5, 1977

[30] Foreign Application Priority Data

Feb. 13, 1976 [JP] Japan .................. 51-13915

[51] Int. Cl.$^2$ .......................................... C08F 297/08
[52] U.S. Cl. ................................................ 260/878 B
[58] Field of Search .................................... 260/878 B

[56] References Cited

U.S. PATENT DOCUMENTS

| 3,642,746 | 2/1972 | Kashiwa et al. | 526/125 |
| 3,974,236 | 8/1976 | Koga et al. | 260/878 B |
| 3,998,911 | 12/1976 | Strametz et al. | 260/878 B |

FOREIGN PATENT DOCUMENTS

| 20621 | 9/1969 | Japan | 260/878 B |

Primary Examiner—Alan Holler
Attorney, Agent, or Firm—Sherman & Shalloway

[57] ABSTRACT

An improved process for preparing an impact-resistant chemically blended propylene polymer or copolymer, which comprises the following three steps:

(1) a first step of polymerizing propylene containing 0 to 1 mole% of another olefin in the presence of a catalyst composed of (a) a carrier-supported titanium catalyst component containing at least magnesium, halogen and titanium on the surface of the carrier and (b) an organo aluminum compound to form specific crystalline polypropylene;

(2) a second step of copolymerizing propylene and ethylene in the presence of the reaction product of the first step and the same catalyst while maintaining the content of propylene in the gaseous phase of the polymerization zone at 65 to 90 mole% thereby to form specific low-crystalline propylene/ethylene copolymer; and (3) a third step of polymerizing ethlene, or both ethylene and propylene in the presence of the reaction product of the second step and the same catalyst while maintaining the content of propylene in the gaseous phase of the polymerization zone at 0 to 15 mole% thereby to form specific polyethylene or ethylene/propylene copolymer.

8 Claims, No Drawings

IMPACT-RESISTANT CHEMICALLY BLENDED PROPYLENE POLYMER COMPOSITION AND PROCESS FOR PREPARATION THEREOF

This invention relates to an impact-resistant chemically blended propylene polymer composition suitable for production of molded articles having superior properties such as impact strength and rigidity, and to a process for producing the composition.

More specifically, the invention relates to a process for preparing an impact-resistant chemically blended propylene polymer composition, which comprises forming crystalline polypropylene composed substantially of propylene and having an isotactic index of at least 90 in the presence of a catalyst composed of (a) a carrier-supported titanium catalyst component containing at least magnesium, halogen and titanium, preferably together with an organic carboxylic acid ester, on the surface of the carrier and (2) an organoaluminum compound; forming a low-crystalline propylene-rich propylene/ethylene copolymer in the presence of the resulting product and the catalyst in the same reaction zone or in a separate reaction zone; and then forming polyethylene or an ethylene-rich ethylene/propylene copolymer having an intrinsic viscosity of at least 2.6 in the presence of the reaction product of the second step and the catalyst in the same reaction zone or in a separate reaction zone, thereby to provide a chemically blended polymer composition having an ethylene content of 3 to 40 mole%.

The term "chemically blended polymer composition", as used in the present application, means that the composition is not a so-called polymer blend obtained by first preparing different polymers or copolymers, and then blending them physically.

Although crystalline polypropylene produced by using stereoregular catalysts have superior rigidity and thermal stability, it suffers from low impact strength particularly at low temperatures, and this disadvantage limits its uses.

In an attempt to overcome the disadvantage, suggestions were made heretofore to produce polymer compositions by mixing polypropylene with polyethylene or an ethylene/propylene copolymer (for example, U.S. Pat. No. 3,256,367, and Japanese Patent Publications Nos. 7345/66 and 22626/70). With physical blending means, however, it is difficult to attain such a high degree of uniformity in the mixing and dispersion of ingredients in the resulting polymer composition as can be done by a chemical means of multi-step polymerization in accordance with the present invention. Presumably for this reason, these prior methods cannot avoid incident deterioration in the desirable properties of polypropylene itself although they do bring about some improvement in the impact resistance of the resulting polymer composition. The mixing operation, too, is complicated, and it is necessary first to prepare polymers to be blended, and then melt-mix them by this complicated operation using extra equipment.

Some suggestions were made, on the other hand, to provide chemically blended polymer compositions by a multi-step polymerization process in an attempt to overcome these difficulties of the polymer blending methods. A first suggestion is disclosed in Japanese Patent Publication No. 20621/69 which relates to the production of a polymer composition having improved impact strength at low temperatures by forming a polymer composed substantially of propylene or a propylene/ethylene copolymer, then forming a propylene-rich propylene/ethylene copolymer, and further forming an ethylene-rich ethylene/propylene copolymer, the reactions all being performed in the presence of a stereoregular catalyst composed of (a) a titanium trichloride composition obtained by reducing $TiCl_4$ with metallic aluminum and (b) an organoaluminum compound. The resulting polymer composition does not show a satisfactory improvement. In order to achieve a further improvement, another suggestion was later made (Japanese Patent Publication No. 24593/74) in which a polymer composition improved over the composition obtained in the first suggestion is prepared using the same catalyst as in the first suggestion by first forming polypropylene, then forming an ethylene-rich ethylene/propylene copolymer, and then forming an ethylene/propylene copolymer having a higher ethylene content. A third suggestion, similar to the second one, was also made (Japanese Patent Publication No. 30264/74) which involves using the same catalyst as in the first and second suggestions, and first forming polypropylene in the presence of a chain-transfer agent, then forming an ethylene-rich ethylene/propylene copolymer, and finally forming polyethylene or an ethylene/propylene copolymer having a higher ethylene content. A fourth suggestion, similar to the third, is also known (DT-PS 2,417,093).

None of these first to fourth suggestions disclose the utilization of a carrier-supported titanium catalyst component. The second to fourth suggestions show that in order to obtain polymer compositions having improved properties, it is important to form an ethylene-rich ethylene/propylene copolymer in the second step instead of the propylene-rich ethylene/propylene copolymer in the second step of the first suggestion.

The present inventors noted that these prior techniques based on multi-step polymerization are directed to polymer compositions containing a major proportion of ethylene component which impairs the desirable properties of crystalline polypropylene, and that chemically blended polymer compositions obtained by these prior suggestions show some improvement but still have unsatisfactory impact strength, and molded articles having rigidity and impact strength in a well balanced state cannot be obtained. Extensive investigations based on these facts led to the discovery that by performing the multi-step polymerization using a carrier-supported titanium catalyst component containing at least magnesium, halogen and titanium on the surface of the carrier and carrying out the second step under conditions which afford a propylene-rich propylene/ethylene copolymer, a chemically blended polymer composition comprising (A), (B) and (C) specified hereinbelow and having an ethylene content of 3 to 40 mole% can be obtained. It has also been found that this propylene polymer composition can afford molded articles having a satisfactorily high degree of impact strength and a desirable balance of impact strength and rigidity.

It is an object of this invention therefore to provide an impact-resistant chemically blended propylene polymer composition having the aforesaid improved properties, and a process for preparing the composition.

Other objects and advantages of the invention will become apparent from the following description.

According to the process of this invention, a chemically blended propylene polymer composition having high impact strength can be obtained by a chemical means of multi-step polymerization consisting of the three steps shown below. Each of the steps needs not to be carried out in one stage, but may be done in two or more stages. For example, an embodiment can be used in which the first step is carried out in two stages, and followed by the second and third steps each performed in one stage.

First step

Propylene containing 0 to 1 mole% of another olefin, preferably propylene alone, is polymerized in the presence of a catalyst composed of (a) a carrier-supported titanium catalyst component containing at least magnesium, halogen and titanium on the surface of the carrier and (b) an organoaluminum compound to form crystalline polypropylene having an isotactic index of at least 90 which accounts for 55 to 95% by weight, preferably 60 to 90% by weight, of the final polymer composition.

Second step

Propylene and ethylene are polymerized in the presence of the reaction product of the first step and the same catalyst while maintaining the content of propylene in the gaseous phase of the polymerization zone at 65 to 90 mole%, preferably 70 to 85 mole%, thereby to form a low-crystalline propylene/ethylene copolymer having a propylene content of 60 to 85 mole%, preferably 65 to 80 mole%, which accounts for 1 to 10% by weight, preferably 2 to 8% by weight, of the final polymer composition.

Third step

Ethylene, or both ethylene and propylene are polymerized in the presence of the reaction product of the second step and the same catalyst while maintaining the content of propylene in the gaseous phase of the polymerization zone at 0 to 15 mole%, preferably 0 to 8 mole%, thereby to form polyethylene or an ethylene/propylene copolymer having a propylene content of up to 10 mole%, preferably up to 8 mole%, especially 2 to 8 mole%, which has an intrinsic viscosity of at least 2.6, preferably at least 3, especially 3 to 10, and accounts for 1 to 35% by weight, preferably 3 to 30% by weight, of the final polymer composition.

In these steps, the reactions are carried out so that the final polymer composition has an ethylene content of 3 to 40 mole%, preferably 5 to 35 mole%.

The combination of the following elements, i.e., (i) the reactions for forming polymer composition are carried out in the presence of a catalyst composed of a carrier-supported titanium catalyst component containing at least magnesium, halogen and titanium on the surface of the carrier and an organoaluminum compound;

(ii) in the second step, propylene is polymerized with ethylene using the propylene in excess to form a propylene-rich propylene/ethylene copolymer having a specified amount of propylene; and (iii) polyethylene or an ethylene-rich ethylene/propylene copolymer having an intrinsic viscosity of at least 2.6 is formed in the third step, is important, in combination with the other conditions specified in the first to third steps, to achieve the objects of this invention. For example, if a propylene/ethylene copolymer having the specified propylene content is formed in the second step but the product of the third step does not have the specified viscosity, the improvement achieved by the present invention cannot be expected.

Thus, according to this invention, there is provided a chemically blended propylene polymer composition having impact strength, said composition comprising (A) 55 to 95% by weight, preferably 60 to 90% by weight, of crystalline polypropylene having another olefin content of 0 to 1 mole% and an isotactic index of at least 90, (B) 1 to 10% by weight, preferably 2 to 8% by weight, of a low-crystalline propylene/ethylene copolymer having a propylene content of 60 to 85 mole%, preferably 65 to 80 mole%, and (C) 1 to 35% by weight, preferably 3 to 30% by weight, of polyethylene or an ethylene/propylene copolymer having a propylene content of 0 to 10 mole% and an intrinsic viscosity of at least 2.6, preferably at least 3, particularly 3 to 10;

and having an ethylene content of 3 to 40 mole%, preferably 5 to 35 mole%, the total amount of the constituents (A), (B) and (C) being 100% by weight.

In the present invention, the intrinsic viscosity [η] of polymers is calculated in accordance with the following equation $$\log (\eta_{sp/c}) = \log[\eta] + 0.18 [\eta]$$

in which the specific viscosity is measured on a decalin solution at 135° C. using a Fitz-Simons viscometer.

The production of the chemically blended impact-resistant propylene polymer composition of this invention will be described in greater detail hereinbelow.

The polymer composition of the invention is obtained by polymerizing or copolymerizing olefins in a series of polymerization systems using a carrier-supported stereoregular catalyst, and in the resulting polymer composition, the individual components are dispersed and mixed in and with one another homogeneously. Physically blended polymer compositions obtained by producing starting polymers or copolymers and then mixing them by physical means are outside the scope of the present invention, as stated hereinabove. The improvement in accordance with this invention cannot be achieved by the physically blended polymer compositions because the properties of polymer compositions are greatly affected by the types and proportions of the constituent polymers or copolymers and the dispersed state of the constituents, and no physical means can achieve such a high degree of uniformity in dispersed state as chemical means can.

In the present invention, the three steps can be carried out in the same zone or in two or more zones, but preferably, each of these steps is carried out in a separate reaction zone. Furthermore, in the process of this invention, the reactions are continued in the presence of the catalyst and the reaction product in the previous step without deactivating the catalyst until the final polymer composition is obtained. As required, a fresh supply of catalyst is added in any desired step. Each of the steps can be carried out in a plurality of stages, and in this case, the final polymer or copolymer obtained after such stages in a step should meet the requirements specified hereinabove. For example, the third step may be operated such that polyethylene or an ethylene/propylene copolymer having a propylene content of not more than 10 mole% is formed in two or more reaction zones to provide a product having an intrinsic viscosity of at least 2.6 on an average.

The catalyst used in the first to third steps is composed of a carrier-supported catalyst component containing at least magnesium, halogen and titanium on the surface of the carrier, and an organoaluminum compound. The carrier-supported catalyst component may be any which contains at least magnesium, halogen and titanium on the surface of the carrier, and which, if desired, has been treated with a donor and/or an active hydrogen-containing compound. Preferably, the carrier-supported titanium catalyst component is treated with an organic carboxylic acid ester, particularly an aromatic carboxylic acid ester. In other words, it is convenient to use a carrier-supported titanium catalyst component containing at least magnesium, halogen and titanium on the surface of the carrier and treated with an organic carboxylic acid ester, particularly an aromatic carboxylic acid ester.

A number of prior suggestions have been known in regard to the preparation of such a carrier-supported titanium catalyst composition (see, for example, DT-PS 2,153,520, DT-PS 2,230,672, DT-PS 2,230,728, DT-PS 2,230,752, DT-PS 2,504,036, NL 75.10394, DT-PS 2,605,922, and Japanese Laid-Open Patent Publications Nos. 126590/74 and 57789/76). Several embodiments of producing the carrier-supported titanium catalyst component containing at least magnesium, halogen and titanium on the surface of the carrier and treated with an organic carboxylic acid ester which is especially suitable for use in the process of this invention are given below.

(1) A magnesium halide, preferably magnesium chloride or magnesium bromide, and an organic carboxylic acid, preferably an aromatic carboxylic acid ester, are mechanically pulverized in the absence or presence of a small amount of a liquid inert diluent, a silicon compound, or an aluminum compound, and the pulverized product is reacted with a titanium halide, preferably titanium tetrachloride, with or without treatment with an organoaluminum compound.

(2) An organic complex between magnesium and aluminum or silicon which contains a halogen atom and an alkoxy group is reacted with an organic carboxylic acid ester, preferably an aromatic carboxylic acid ester, and the reaction product is further reacted with a titanium compound, preferably titanium tetrachloride.

(3) The product obtained in (1) or (2) is further reacted with an organic carboxylic acid ester, preferably an aromatic carboxylic acid ester, and a titanium compound, preferably titanium tetrachloride.

(4) The product obtained in (1) or (2) is further reacted with an organic carboxylic acid ester, preferably an aromatic carboxylic acid ester, a titanium compound, preferably titanium tetrachloride, and an organoaluminum compound.

Titanium in the titanium complex produced by using titanium tetrachloride in the embodiments (1), (2) and (3) above is tetravalent in most cases. When titanium tetrachloride is used in method (4), titanium in the titanium complex is in most cases a mixture of tetravalent titanium and trivalent titanium, although it differs according to the amount of the organoaluminum compound to be reacted.

The organic carboxylic acid ester used in the above embodiments may, for example, by (i) aliphatic carboxylic acid esters and halogenated aliphatic carboxylic acid esters, or (ii) aromatic carboxylic acid esters.

Aliphatic carboxylic acid esters or halogenated aliphatic carboxylic acid esters (i) usually employed are esters formed between saturated or unsaturated aliphatic carboxylic acids containing 1 to 8 carbon atoms, preferably 1 to 4 carbon atoms, or halogen-substituted products thereof, and saturated or unsaturated aliphatic primary alcohols containing 1 to 8 carbon atoms, preferably 1 to 4 carbon atoms, saturated or unsaturated alicyclic alcohols containing 3 to 8 carbon atoms, preferably 5 or 6 carbon atom, phenols containing 6 to 10 carbon atoms, preferably 6 to 8 carbons, or aliphatic saturated or unsaturated primary alcohols containing 1 to 4 carbon atoms bonded to alicyclic or aromatic rings containing 3 to 10 carbon atoms.

Aromatic carboxylic acid esters (ii) generally employed are esters formed between aromatic carboxylic acids containing 7 to 12 carbon atoms, preferably 7 to 10 carbon atoms, and saturated or unsaturated aliphatic primary alcohols containing 1 to 8 carbon atoms, preferably 1 to 4 carbon atoms, phenols containing 3 to 8 carbon atoms, preferably 6 to 8 carbon atoms, or aliphatic saturated or unsaturated primary alcohols containing 1 to 4 carbon atoms bonded to alicyclic or aromatic rings containing 3 to 10 carbon atoms.

Specific examples of the aliphatic carboxylic acid esters (i) include alkyl esters of saturated fatty acids such as methyl formate, ethyl acetate, n-amyl acetate, 2-ethylhexyl acetate, n-butyl formate, ethyl butyrate or ethyl valerate; alkenyl esters of saturated fatty acids such as vinyl acetate or allyl acetate; and primary alkyl esters of unsaturated fatty acids as methyl acrylate, methyl methacrylate or n-butyl crotonate.

Specific examples of the aromatic carboxylic acid esters (ii) are alkyl esters of benzoic acid such as methyl benzoate, ethyl benzoate, n-propyl benzoate, n- or i-butyl benzoate, n- or i-amyl benzoate, n-hexyl benzoate, n-octyl benzoate or 2-ethylhexyl benzoate; alkyl esters of toluic acid such as methyl toluate, ethyl toluate, n- or i-butyl toluate, or 2-ethylhexyl toluate; alkyl esters of anisic acid such as methyl anisate, ethyl anisate or n-propyl anisate; and primary alkyl esters of naphthoic acid such as methyl naphthoate, n-propyl naphthoate, n-butyl naphthoate, or 2-ethylhexyl naphthoate.

The aromatic carboxylic acid esters are preferred among them. Especially preferred aromatic carboxylic acid esters are $C_{1-8}$ alkyl esters of monocyclic aromatic carboxylic acids such as methyl benzoate, ethyl benzoate, methyl p-toluate, ethyl p-toluate, methyl p-anisate, and ethyl p-anisate.

The liquid inert diluent used in the above embodiments may include, for example, hydrocarbons, halogenated hydrocarbons and carbon halides which are liquid at room temperature. Specific examples include aliphatic hydrocarbons such as n-pentane, iso-pentane, n-hexane, isohexane, n-heptane, n-octane, 2-ethylhexane, n-decane, and kerosene; alicyclic hydrocarbons such as cyclopentane, cyclohexane, and methyl cyclohexane; aromatic hydrocarbons such as benzene, toluene, xylene, ethylbenzene, cumene, cymene, mesitylene, pseudocumene, and butyl benzene; halogenated hydrocarbons such as methylene chloride, ethyl chloride, ethylene chloride, trichloroethylene, chlorobenzene, n-propyl chloride, iso-propyl chloride and chloroform, and carbon halides such as carbon tetrachloride.

Examples of the silicon compound used in the above embodiments are listed below.

(i) $R_xSi_yX_z$ wherein R is selected from the group consisting of a hydrogen atom, alkyl group preferably having 1 to 8 carbon atoms, aryl groups, preferably phenyl or naphthyl, alkoxy groups preferably having 1 to 8 carbon atoms, and aryloxy groups, preferably phenoxy or naphthoxy, with the proviso that where $x$ is 2 or more, two or more R groups are the same or different; X is a halogen atom such as a chlorine, bromine or iodine atom; and $x$ and $z$ are zero or integers of at least 1, and $y$ is an integer of at least 1, and $x + z = 2y + 2$. Specific examples of silicon compounds within this group are silicon tetrahalides such as silicon tetrabromide or silicon tetrachloride; silicon alkylhalides such as methylsilicon trichloride ethylsilicon trichloride, butylsilicon trichloride, dimethylsilicon dichloride, diethylsilicon dichloride, dibutylsilicon dichloride, trimethylsilicon chloride, triethylsilicon chloride or tributylsilicon chloride; tetraalkyl silanes such as tetramethyl silane, tetraethyl silane, tetra-n-propyl silane, tetra-n-butyl silane and tetra (n- or i-) amyl silane, tetraaryl silanes such as tetraphenyl silane or tetra(3- or 4-) tolyl silane, and tetracycloalkyl silanes such as tetracyclopentyl silane, tetracyclohexyl silane or tetrakis(3- or 4-) methylcyclohexyl silane; and other silicon compounds such as $Si[OC_6H_3$-2, 6-$(CH_3)_2]Cl_3$, $Si(OC_2H_5)Cl_3$, $Si(OC_2H_5)_2Cl_2$, $Si(OC_2H_5)_3Cl$, $Si(OC_2H_5)_4$, $Si(OCOCH_3)Cl_3$, $Si(OCOCH_3)(OC_2H_5)Cl_2$, $CH_3Si(OC_2H_5)_3$, $C_6H_5Si(OC_2H_5)_3$, $(C_6H_5)_3SiOCOCH_3$, $CH_3Si(OCOCH_3)_3$, $(C_2H_5)_2Si(OC_2H_5)_2$, $(n$-$C_4H_9)_3SiOCOC_4H_9$.

Other examples are polyhalopolysilanes such as hexahalodisilanes, octahalotrisilanes, decahalotetrasilanes, dodecahalopentasilanes, tetradecahalohexasilanes or docosahalodecasilanes. In these polyhalopolysilanes, the halogen atoms may be identical or different. Specific examples include trichlorotribromodisilane, hexachlorodisilane, hexabromodisilane, hexaiododisilane, hexafluorodisilane, octachlorotrisilane, octabromotrisilane, decachlorotetrasilane, dodecachloropentasilane, and docosachlorodecasilane.

Still other examples include methylpentachlorodisilane, ethylpentachlorodisilane, 1,1-dimethyl-1,2,2,2-tetrachlorodisilane, 1,1-diethyl-1,2,2,2-tetrachlorodisilane, 1,1,2-trimethyl-1,2,2-trichlorodisilane, 1,1,1-trimethyl-2,2,2-trichlorodisilane, 1,1,2-tri-i-butyl-1,2,2-trichlorodisilane, 1,1,2,2-tetramethyl-1,2-dichlorodisilane, 1,1,1,2-tetramethyl-2,2-dichlorodisilane, pentamethylchlorodisilane, $(SiMe_2Cl)_2Si(Me)Cl$, $(SiMe_2Cl)_2SiMe_2$, $C_5H_5(SiMe_2)Me$, $Ph(SiMe_2)_3Ph$, $Cl(SiMe_2)_4Cl$, $Cl(SiMe_2)_4Ph$, $Cl(Me_2Si)_5Cl$, $Me(Me_2Si)_5Cl$, and $Ph_3Si(Ph_2Si)_3SiPh_3$.

(ii) Polysiloxanes expressed by the following formulae:
(a) $Q(Q_2SiO)_nSiQ_3$ wherein Q groups are identical or different, and each represent a hydrogen atom, an alkyl group, for example, an alkyl group containing 1 to 4 carbon atoms, a cycloalkyl group, for example, a cycloalkyl group containing 3 to 8 carbon atoms, or an aryl group, for example, an aryl group containing 6 to 8 carbon atoms, with the proviso that all Q groups are not hydrogen atoms at the same time; n is an integer of 1 to 1000;

Specific examples of linear polysiloxanes of the formula $Q(Q_2SiO)_nSiQ_3$ are hexamethyldisiloxane, decamethyltetrasiloxane, tetracosamethylundecasiloxane, 3-hydroheptamethyltrisiloxane, 3,5-dihydrooctamethyltetrasiloxane, 3,5,7-trihydrononamethylpentasiloxane, tetramethyl-1,3-diphenyldisiloxane, pentamethyl-1,3,5-triphenyltrisiloxane, heptaphenyldisiloxane, and octaphenyltrisiloxane.

(b) $(Q_2SiO)_n$ wherein Q and n are the same as defined above,

Specific examples of cyclopolysiloxanes of the formula $(Q_2SiO)_n$ as the Si component (ii) include 2,4,6-trimethylcyclotrisiloxane, 2,4,6,8-tetramethylcyclotetrasiloxane, hexamethylcyclotrisiloxane, octamethylcyclotetrasiloxane, decamethylcyclopentasiloxane, dodecamethylcyclohexasiloxane, triphenyl-1,3,5-trimethylcyclotrisiloxane, hexaphenylcyclotrisiloxane, and octaphenylcyclotetrasiloxane.

(c) $X(Q_2SiO)_nSiQ_2X$ wherein Q, n and X are the same as defined above.

Specific examples of linear $\alpha,\omega$-dihalopolysiloxanes of the formula $X(Q_2SiO)_nSiQ_2X$ as the Si component include 1,3-dichlorotetramethyldisiloxane, 1,5-dichlorohexamethyltrisiloxane, and 1,7-dichlorooctamethyl tetrasiloxane.

Typically, the aluminum compound used in the above embodiments is a compound of the general formula $$AlR_lX_{3-l}$$

wherein R is an organic group, X is halogen, and $0 \leq 1 \leq 3$.

Specific examples include the following.
$AlCl_3$, $Al(C_2H_5)Cl_2$, $Al(OC_2H_5)Cl_2$, $Al(OCOCH_3)Cl_2$, $Al[OC_6H_3$-2,6-$(CH_3)_2]Cl_2$, $Al(CH_3)Cl_2$, $Al(OCH_3)Cl_2$, $Al(C_2H_5)_2Cl$, $Al(OC_2H_5)(C_2H_5)Cl$, $Al(OC_2H_5)_2Cl$, $Al[OC_6H_5$-2,6-$(CH_3)_2]_2Cl$, $Al(OCOCH_3)(C_2H_5)Cl$, $Al(OCOCH_3)_2Cl$, $Al(OC_2H_5)(OCOC_2H_5)Cl$, $Al(OCOC_6H_5)(OC_2H_5)Cl$, $Al(C_2H_5)_3$, $Al(isoC_4H_9)_3$, $Al(OC_2H_5)(C_2H_5)_2$, $Al(OC_2H_5)_2C_2H_5$, $Al(OC_2H_5)_3$, $Al(OCOCH_3)(C_2H_5)_2$, $Al(OCOCH_3)(OC_2H_5)_2$, $Al(OCOC_6H_5)(C_2H_5)_2$, $Al(OCOC_6H_5)(OC_2H_5)_2$ and $Al(CH_3COCHCOCH_3)_3$, and compounds to the above-exemplified compounds in which Cl is replaced by Br or I.

The organoaluminum compound used in the above embodiments include, for example, compound of the formula $R'_{3-m}AlX_m$ wherein R' is a hydrogen atom, or an alkyl or aryl group, X is a halogen atom, and m is 0 or a positive number of less than 3, compounds of the formula $R'_{3-n}Al(OR)_n$ wherein R is an alkyl or aryl group, R' is as defined above, and n is a positive number greater than 0 but less then 3, and compounds of the formula RAl(OR)X wherein R and X are as defined above. Examples are trialkyl aluminums, alkyl aluminum halides, alkyl aluminum hydrides, and alkylaluminum alkoxides.

Specific examples, are triethyl aluminum, diethyl aluminum hydride, tripropyl aluminum, tributyl aluminum, diethyl aluminum chloride, diethyl aluminum bromide, diethyl aluminum ethoxide, diethyl aluminum phenoxide, ethyl aluminum ethoxychloride, ethyl aluminum sesquichloride, diethyl aluminum ethoxide and ethyl aluminum diethoxide.

In the process of this invention, the reactions for forming the desired polymer compositions are carried out in the presence of the catalyst described hereinabove which is composed of a carrier-supported titanium catalyst component containing at least magnesium, halogen and titanium on the surface of the carrier and an organoaluminum compound.

Examples of the organoaluminum compound used in preparing this catalyst are trialkyl aluminums or dialkyl aluminum halides containing an alkyl group with 1 to 12 carbon atoms. The use of the trialkyl aluminums is preferred. Examples of suitable organoaluminum compounds include $(C_2H_5)_3Al$, $(i-C_4H_9)_3Al$, $[CH_3CH(CH_3)CH_2CH_2CH_3]_3Al$, and $(C_{12}H_{25})_3Al$.

The process of this invention may be performed in the presence of an organic carboxylic acid ester, preferably an aromatic carboxylic acid ester. The same esters as exemplified hereinabove with regard to the production of the carrier-supported titanium catalyst component can be used as the organic carboxylic acid esters for this purpose. These esters serve to increase the ratio of a highly stereoregular polymer formed, when the polymerization is carried out in the presence of hydrogen as a chaintransfer agent. The introduction of the carrier-supported titanium catalyst component, the organoaluminum compound catalyst component, and the organic carboxylic acid ester into the reaction zones and the mixing of them may be performed in any desired sequence. The amount of the free organic carboxylic acid ester used is, for example, not more than about 1 mole, preferably about 0.01 to about 0.5 mole, per aluminum atom of the organoaluminum compound in the catalyst.

In the process of this invention, the first step of forming crystalline polypropylene having an isotactic index of at least 90 is carried out in the presence of the aforementioned catalyst using propylene which may contain up to about 1 mole% of ethylene. The polymerization is carried out at a temperature of from room temperature to about 100° C., preferably about 20° to about 80° C., more preferably about 30 to about 80° C. and a pressure of from atmospheric pressure to about 30 kg/cm², preferably from atmospheric pressure to about 20 kg/cm². Preferably, the reaction is carried out in an inert hydrocarbon solvent such as pentane, hexane, heptane or kerosene. Preferably, the concentration of the catalyst is such that the amount of the titanium catalyst component is about 0.01 to about 10 millimole/liter calculated as the titanium atom, and the amount of the organoaluminum compound is about 0.01 to about 30 millimoles/liter, both based on the volume of the solvent. Hydrogen is most preferred as a chain transfer agent, but the use of chain transfer agents is not essential. The amount of hydrogen as a chain transfer agent is up to about 20 mole% based on the monomers fed to the polymerization vessel.

The purpose of the first-step polymerization is to provide crystalline polypropylene having superior rigidity, and it is preferred therefore, to polymerize propylene alone. However, a minor amount, for example, up to about 1 mole%, of another olefin such as ethylene may be present together. The first-step polymerization is effected so as to provide crystalline polypropylene having an isotactic index of at least 90 which accounts for about 55 to about 95% by weight, preferably about 60 to 90% by weight, of the final polymer composition. The isotactic index is determined as follows:

The polymer is recovered from the slurry after polymerization, and dried. The resulting powdery polymer is extracted for 6 hours with n-heptane using a Soxhlet extractor. The isotactic index of the polymer is defined as the percentage of the weight of the residue of polymer after extraction to the weight of the polymer before extraction.

The second step of forming a low-crystalline propylene-rich propylene/ethylene copolymer in the process of this invention is carried out in the presence of the reaction product of the first step and in the presence of the aforementioned catalyst. Preferably, prior to the polymerization in the second step, the monomers, or both the monomers and hydrogen, remaining at the end of the first step are removed by flushing, and then a mixture of ethylene and propylene is introduced and polymerized while maintaining the propylene content in the gaseous phase of the polymerization zone at 65 to 90 mole%. If desired, an alternative procedure may be employed in which the unreacted monomers are left partly or wholly, and ethylene or both ethylene and propylene are introduced into the polymerization zone to adjust the monomer composition as specified above.

The second step is carried out so as to provide a propylene-rich propylene/ethylene having a propylene content of 60 to 85 mole%, preferably 65 to 80 mole%, which accounts for 1 to 10% by weight, preferably about 2 to about 8% by weight, of the final polymer composition. In order to obtain a copolymer of this composition, the propylene content of the gaseous phase of the polymerization zone is adjusted to 65–90 mole%, preferably 70–85 mole%.

Since there is some difference in copolymerizability between ethylene and propylene depending upon the catalyst system used, it is desirable to perform a preliminary experiment of copolymerization in order to predetermine the monomer composition of the gaseous phase in the polymerization zone.

The second-step polymerization may be carried out in the absence or presence of hydrogen as a chain transfer agent. In view of the properties of the final polymer composition, it is preferred to perform the above copolymerization in the substantial absence of hydrogen to form a propylene-rich propylene/ethylene copolymer having a relatively high molecular weight. Other polymerization conditions are preferably the same as in the first step.

In the second step, homopolymers of ethylene and propylene may form in small amounts together with the ethylene/propylene copolymer. The purpose of the second step is to form a low-crystalline propylene-rich propylene/ethylene copolymer, and this purpose can be achieved by forming the polymer in an amount of 1 to 40% by weight based on the weight of the polymer produced in the first step.

The third step of forming polyethylene or an ethylene-rich ethylene/propylene copolymer having an intrinsic viscosity of at least 2.6 is carried out in the presence of the reaction product of the second step and the catalyst. In this polymerization, ethylene alone is polymerized, or a mixture of propylene and ethylene is polymerized while maintaining the propylene content of the gaseous phase of the polymerization zone at up to 15 mole%, preferably up to 10 mole% (that is, the ethylene content of at least 85 mole%, preferably at least 90 mole%).

Prior to the polymerization in the third step, the unreacted monomers in the second step may be removed; or they are left unremoved and the monomer composition is adjusted to the aforementioned range. The polymerization is carried out in the presence or absence of a chain transfer agent. It is necessary to adjust the intrinsic viscosity of the polymer formed in the third step to at least 2.6, preferably at least 3, more preferably 3 to 10. The third step is performed so as to afford the polymer or copolymer which accounts for 1 to 35% by weight, preferably 3 to 30% by weight, of the final polymer composition.

By the procedure mentioned above, a polymer composition having an ethylene content of 3 to 40 mole%, preferably about 5 to about 35 mole%, is formed as a final product.

The composition and amount of the polymer in each step can be easily controlled by properly selecting polymerization conditions such as the polymerization temperature, the concentrations of the catalyst components, the concentration of monomers, the monomer composition, the concentration of chain transfer agent, the pressures of monomers, and the residence time. The intrinsic viscosity of the product obtained in the third step can be easily calculated in accordance with the following equation once the intrinsic viscosities of the polymers obtained in the first and second steps are measured.

$$[\eta]_{final} = \Sigma\ Ci[\eta]_i$$

wherein $[\eta]_{final}$ is the intrinsic viscosity of the final polymer composition; Ci is the percentage of the weight of the polymer formed in a step whose position in a series of steps is indicated by an ordinal number $i$ to the weight of the entire polymer; and $[\eta]_i$ is the intrinsic viscosity $[\eta]$ of the polymer formed in the step indicated by the ordinal number $i$.

Thus, by measuring the amounts and intrinsic viscosities of the polymers withdrawn before the final step, the intrinsic viscosity of the polymer formed in the third step can be calculated.

Since the polymer composition obtained by this invention is formed by a chemical means in a series of polymerization reaction systems, the constituents of the composition are far more uniformly dispersed and mixed than a mechanical blend of polymers obtained, and the composition of the invention has properties not obtainable by the mechanical blend. The use of the specific carrier-supported titanium catalyst component contributes to the homogeneous dispersed state of the constituent polymers in the polymer composition of this invention. The polymer obtained in each step has some distribution in composition, and the chemically blended product obtained by the three steps, on an average, becomes a final polymer composition composed of the components (A), (B) and (C) in the proportions specified above.

The polymer components (A), (B) and (C) in the final chemically blended polymer composition formed by the process of this invention can be fractionated by the following methods, and the proportions of them can accordingly be determined.

(1) The final composition is dissolved in refined kerosene heated at 150° C., and then the solution is cooled to room temperature. Thus, the composition is separated into a fraction soluble in kerosene and a fraction insoluble in it. The fraction soluble in kerosene corresponds to component (B) in the final composition of this invention.

(2) The fraction insoluble in kerosene obtained by procedure (1) is further extracted with kerosene at 110° C. The polymer obtained as a fraction insoluble in kerosene at 110° C. by this procedure is high-molecular weight polypropylene or propylene-rich propylene-/ethylene polymer.

(3) The polymer obtained as a fraction soluble in kerosene at 110° C. by the above procedure (2) is extracted under heat with a mixture of kerosene and butyl carbitol to separate it into polyethylene or ethylene-rich ethylene/propylene copolymer as an insoluble fraction, and low-moleculer-weight polypropylene or polypropylene-rich propylene/ethylene copolymer as a soluble fraction.

(4) The sum of the fraction insoluble in kerosene at 110° C. obtained by procedure (2) and the fraction soluble in the mixed solvent by procedure (3) corresponds to component (A) in the final polymer composition of this invention.

The molar ratio between ethylene and propylene in each polymer can be determined in a customary manner by a melting infrared spectroscopic method and an NMR spectroscopic method.

The impact strength of the polymer composition of the present application means a falling dart impact strength measured in accordance with ASTM D-1709-62T.

The following Examples and Comparative Examples illustrate the present invention specifically.

EXAMPLE 1

Preparation of a titanium catalyst composition

One kilogram of commercially available anhydrous magnesium chloride and 0.23 liter of ethyl benzoate were placed in an atmosphere of nitrogen in a stainless steel (SUS 32) vibratory ball mill accomodating therein 36 kg of stainless steel balls, and pulverized at 7.8 G for 24 hours. The treated solid product was suspended in titanium tetrachloride, and contacted with stirring at 80° C. for 2 hours. The solid component was collected by filtration, washed with titanium tetrachloride, and washed with refined hexane until no titanium was detected in the wash liquid. Drying of the product afforded a titanium-containing solid catalyst component. The resulting titanium catalyst component contained 2.1% by weight of titanium as atom and 64.5% by weight of chlorine as atom in addition to magnesium, and the molar ratio of ethyl benzoate to the titanium atom in the solid catalyst component was 1.4.

Preparation of a polymer composition

The apparatus used included three polymerization reactors A, B and C each having a capacity of 10 liters and connected in series and a flush tank D (capacity 5 liters) placed between the polymerization reactors B and C. The reactor A was continuously charged with 0.15 millimole/hr, calculated as titanium atom, of the titanium catalyst component prepared as set forth in the previous paragraph as a hexane slurry, 3 millimoles/hr of triethyl aluminum as a hexane solution, 1.2 millimoles/hr of ethyl benzoate as a hexane solution, and the hexane at a total rate of 0.68 liter/hr. Propylene was fed at a rate of 0.25 NM$^3$/hr. Furthermore, hydrogen was added so that the content of hydrogen in the gaseous phase became 4 mole%, and propylene was polymerized at 60° C. The pressure of the inside of the reactor A was 7 kg/cm$^2$.G. In the reactor A, polypropylene having a melt index (measured at 190° C. under a load of 2.16 kg) of 6.5 and an isotactic index of 94.1 was formed at a rate of 312 g/hr.

The slurry discharged from the reactor A was fed to the reactor B, and 13.3 Nl/hr of propylene and 11.7 Nl/hr of ethylene and 1 liter/hr of hexane was fed into the reactor B. The pressure of the inside of the reactor B was 2.1 kg/cm$^2$.G, and the propylene content in the gaseous phase was 86.2 mole%. A copolymer was obtained at a rate of 59 g/hr in the reactor B.

Subsequently, the slurry from the reactor B was conducted to the flush tank D to remove the unreacted monomers and hydrogen. Then, the slurry was introduced into the reactor C. Ethylene was fed into the reactor C at a rate of 66.7 Nl/hour, and hydrogen was added so that the hydrogen content in the gaseous phase became 4 mole%. Ethylene was thus polymerized in the reactor C.

By pressure reduction, the unreacted monomer and hydrogen were removed from the effluent that came from the reactor C. The resulting polymer was separated by filtration, and dried to afford a white powdery final polymer composition at a rate of 458 g/hr. The resulting final polymer composition had a melt index of 2.47 and an intrinsic viscosity of 2.61. The ethylene content of the final polymer composition was 24.2 mole%. The polymer formed in the reactor C had an intrinsic viscosity of 3.6.

A part of the final polymer composition was dissolved in kerosene at 150° C., and cooled to room temperature. The polymer precipitated was separated, and an amorphous polymer containing 80 mole% of propylene was obtained from the kerosene solution. The proportion of the amorphous polymer was 2.74% by weight of the final polymer composition.

An antioxidant was added to the polymer composition, and test pieces were prepared. The yield strength and falling dart impact strength of the test pieces were 275 kg/cm$^2$ and 174 kg.cm.

Comparative Example 1

This Comparative Examples show that the intrinsic viscosity of the ethylene polymer (C) in the final polymer composition of this invention markedly affects the properties of the final polymer composition.

In the procedure of Example 1, the polymer slurry discharged from the reactor A was conducted to a flush tank E to remove the unreacted monomers, and then introduced into the reactor B. By introducing 19.3 Nl/hr of ethylene, 13.3 Nl/hr of propylene and 1.0 liter/hr of hexane into the reactor B and adjusting the propylene content in the gaseous phase to 84.3 mole%, ethylene was copolymerized with propylene. The pressure of the inside of the reactor B was 2.1 kg/cm$^2$.G.

Subsequently, the polymer slurry was conducted to the flush tank D to remove the unreacted monomers. By introducing ethylene at a rate of 103.3 Nl/hr and hydrogen in an amount which provided a hydrogen concentration in the gaseous phase of 45.8 mole%, ethylene was polymerized.

After the polymerization, the product was treated in the same way as in Example 1 to afford a polymer composition having an ethylene content of 31.5 mole%, a melt index of 1.63, and an intrinsic viscosity of 3.77. The composition was extracted with kerosene, and it was found that the final polymer composition contained 4.85% by weight of an amorphous copolymer containing 80 mole% of propylene.

The ethylene polymer obtained in the reactor C was had an intrinsic viscosity of 1.8.

The resulting polymer composition had a yield strength of 264 kg/cm and a falling dart impact strength of 31 kg.cm.

EXAMPLE 2

Preparation of a titanium catalyst component

One kilogram of commercially available anhydrous magnesium chloride, 0.25 liter of ethyl benzoate and 0.15 liter of methylpolysiloxane having a viscosity of 20 centipoises at 25° C. were pulverized in a vibratory ball mill at 70° C. for 24 hours in an atmosphere of nitrogen. The resulting solid product was suspended in a solution of titanium tetrachloride in hexane (concentration 1 mole/liter), and contacted with it with stirring at 100° C. for 2 hours. The solid component was collected by filtration, and washed with hexane under heat until no titanium was detected in the wash liquid. The solid component was dried to afford a titanium-containing solid catalyst component which contained 1.2% by weight of titanium as atom, 64.9% by weight of chlorine as atom, and 11.3% by weight of ethyl benzoate.

Preparation of a polymer composition

The apparatus used included four polymerization reactors A, B, C and E each having a capacity of 10 liters and connected in series, and a flush tank D having a capacity of 5 liters and disposed between the reactors B and C.

The reactor A was charged continuously with 0.1 millimole/hour of the titanium catalyst component obtained by the procedure set forth in the preceding paragraph as a hexane slurry, 3 millimoles/hr or triethyl aluminum as a hexane solution, 1.2 millimoles/hr of ethyl benzoate as a hexane solution and the hexane at a total rate of 0.68 liter/hr, and 0.25 NM$^3$/hr of propylene. Hydrogen was added so that the hydrogen content in the gaseous phase became 3 mole%. Propylene was polymerized at 60° C. The pressure of the inside of the reactor A was 7 kg/cm$^2$.G. In the reactor A, polypropylene having a melt index of 4.3 and an isotactic index of 94.2 was formed at a rate of 312 g/hr.

The polymer slurry discharged from the reactor A was fed into the reactor B, and 13.3 Nl/hr of propylene and 11.7 Nl/hr of ethylene and 1 liter/hr of hexane were fed into the reactor B. Ethylene was copolymerized with propylene. The pressure of the inside of the reactor B was 2.1 kg/cm$^2$.G. The propylene content in the gaseous phase was 85.0 mole%. In the reactor B, a polymer was formed at a rate of 53 g/hr. The polymer formed in the reactor B had an intrinsic viscosity of 4.22.

The polymer slurry discharged from the reactor B was conducted to the flush tank D to remove the unreacted monomers and hydrogen. Then, ethylene was introduced at a rate of 40.0 Nl/hr. The ethylene content in the gaseous phase was 95.3 mole%. Ethylene was polymerized while adjusting the hydrogen content to 6.2 mole% based on the gaseous phase. An ethylene polymer having an intrinsic viscosity of 3.04 was obtained at a rate of 59 g/hr.

The effluent from the reactor E was treated in the same way as in Example 1 to afford a polymer composition having a melt index of 1.7 and an intrinsic viscosity of 2.88 at a rate of 495 g/hr. The polymer composition had an ethylene content of 34.0 mole%.

The polymer composition formed was extracted with kerosene in the same way as in Example 1, and it was found that the composition contained 2.62% by weight of an amorphous ethylene/propylene copolymer containing 81 mole% of propylene.

The resulting polymer composition had a yield strength of 271 kg/cm$^2$ and a falling dart impact strength of 185 kg/cm.

Comparative Example 2

This Comparative Examples shows that the composition of the low-crystalline ethylene/propylene copolymer in Example 1 markedly affects the properties of the resulting final polymer composition.

Polymerization was performed using the same polymerization apparatus as used in Example 2.

The reactor A was charged with 0.1 millimole/hr, calculated as titanium atom, of the titanium catalyst component prepared in Example 2 as a hexane slurry, 0.5 millimole/hr of triethyl aluminum as a hexane solution, 0.2 millimole/hr of ethyl benzoate as a hexane solution, and the hexane at a total rate of 0.68 liter/hr. Propylene was polymerized by introducing it at a rate of 0.26 NM$^3$/hr. The pressure of the inside of the reactor A was 7.0 kg/cm$^2$.G.

The polymer slurry from the reactor A was conducted to the reactor B. Hexane was fed into the reactor B at a rate of 0.3 liter/hr, and propylene was subsequently polymerized. In the reactors A and B, polypropylene having an isotactic index of 92 was formed at a rate of 306 g/hr.

The polymer slurry from the reactor B was introduced into the flush tank D to remove the unreacted monomer, and then introduced into the reactor C. By introducing 33.3 Nl/hr of ethylene and 16.7 Nl/hr of propylene into the polymerization reactor C, ethylene was copolymerized with propylene. The ethylene content in the gaseous phase in the reactor C was 69.6 mole%. In the reactor C, an ethylene/propylene copolymer was formed at a rate of 58 g/hr.

The polymer slurry from the reactor C was then introduced into the reactor E. Ethylene was polymerized there by feeding it at a rate of 24.1 Nl/hr. When the hydrogen content in the gaseous phase was adjusted to 1.5 mole%, polyethylene having an intrinsic viscosity of 7.5 was formed in the reactor E.

The polymer slurry discharged from the reactor E was treated in the same way as in Example 1 to afford a polymer composition having an ethylene content of 31.5 mole%, a melt index of 1.63 and an intrinsic viscosity of 3.77 at a rate of 450 g/hr.

The resulting polymer composition was extracted with kerosene in the same way as in Example 1, and it was found that the polymer composition contained 2.74% by weight of an amorphous ethylene/propylene copolymer containing 58 mole% of propylene.

The resulting polymer composition had a yield strength of 238 kg/cm$^2$ and a falling dart impact strength of 77 kg.cm.

EXAMPLE 3

Preparation of a titanium catalyst component

The same vibratory ball mill as used in Example 1 was charged with 1 kg of commercially available anhydrous magnesium chloride, 0.23 liter of ethyl benzoate and 0.15 liter of methylpolysiloxane having a viscosity of 20 centipoises, and they were contacted with one another at 70° C. for 85 hours. The resulting solid product was suspended in titanium tetrachloride, and contacted with stirring for 2 hours at 80° C. The solid component was collected by filtration, washed at 80° C., and washed with refined hexane until no titanium was detected in the wash liquid. The solid component was dried to afford a titanium-containing solid catalyst component which contained 2.1% by weight of titanium as atom and 63.0% by weight of chlorine as atom, and 9.1% by weight of ethyl benzoate.

Preparation of a polymer composition

The apparatus used included four polymerization reactors A, B, C and E each having a capacity of 10 liters and connected in series, and a flush tank D having a capacity of 5 liters and disposed between the reactors C and E.

The reactor A was charged with 0.029 millimole/hr, calculated as titanium atom, of the titanium-containing component prepared by the procedure set forth above as a hexane solution, 1.45 millimoles/hr of triethyl aluminum as a hexane solution, 0.56 millimole of ethyl benzoate as a hexane solution, and the hexane in a total amount of 0.7 liter/hr.

Propylene was polymerized by continuously feeding it into the reactor A at a rate of 0.29 NM$^3$/hr. The pressure of the inside of the reactor A was 10 kg/cm$^2$.G. The polymer slurry from the reactor A was introduced into the reactor B to polymerize the unreacted propylene further. In the reactors A and B, polypropylene having an isotactic index of 93.0 was formed at a rate of 395 g/hr.

The polymer slurry discharged from the reactor B was introduced into the reactor C. Ethylene was introduced into the reactor C at a rate of 86.7 Nl/hr, and ethylene was copolymerized with propylene. The propylene content in the gaseous phase in the reactor C was 79.0 mole%. In the reactor C, a copolymer was formed at a rate of 66 g/hr.

The polymer slurry discharged from the reactor C was introduced into the flush tank D to remove the unreacted propylene, and then introduced into the reactor E. Ethylene was polymerized in the reactor E by feeding it at a rate of 19.7 Nl/hr. The hydrogen concentration in the gaseous phase of the reactor E was adjusted to 2.3 mole%. The ethylene polymer formed in the reactor E had an intrinsic viscosity of 4.16.

The effluent from the reactor E was treated in the same way as in Example 1 to afford a polymer composition at a rate of 576 g/hr.

The resulting polymer composition was extracted with kerosene in the same manner as in Example 1, and it was found that the polymer composition contained 3.8% by weight of an amorphous copolymer of ethylene and propylene containing 73 mole% of propylene.

The polymer composition had a yield strength of 241 kg/cm$^2$ and a falling dart impact strength of 215 kg/cm.

What we claim is:

1. A process for preparing an impact-resistant chemically blended propylene polymer composition having an ethylene content of 3 to 40 mole%, which consists essentially of the following three steps:
    (1) a first step of polymerizing propylene containing 0 to 1 mole% of another olefin in the presence of a catalyst composed of (a) a carrier-supported titanium catalyst component containing at least magnesium, halogen and titanium on the surface of the carrier and (b) an organoaluminum compound to form crystalline polypropylene having an isotactic index of at least 90 which accounts for 55 to 95% by weight of the final polymer composition;

(2) a second step of copolymerizing propylene and ethylene in the presence of the reaction product of the first step and the same catalyst while maintaining the content of propylene in the gaseous phase of the polymerization zone at 65 to 90 mole% therby to form a low-crystalline propylene/ethylene copolymer having a propylene content of 60 to 85 mole% which accounts for 1 to 10% by weight of the final polymer composition; and (3) a third step of polymerizing ethylene, or both ethylene and propylene in the presence of the reaction product of the second step and the same catalyst while maintaining the content of propylene in the gaseous phase of the polymerization zone at 0 to 15 mole% thereby to form polyethylene or an ethylene/propylene copolymer having a propylene content of up to 10 mole% which has an intrinsic viscosity of at least 2.6 and accounts for 1 to 35% by weight of the final polymer composition.

2. The process of claim 1 wherein the carrier-supported titanium catalyst component has been treated with an organic carboxylic acid ester.

3. The process of claim 1 wherein the reactions for forming the polymer composition are carried out in the presence of an inert hydrocarbon solvent at room temperature to about 100° C. under atmospheric pressure to about 30 kg/cm².

4. The process of claim 3 wherein the catalyst is composed of about 0.01 to about 10 millimoles/liter of solvent of the carrier-supported catalyst component (a) and about 0.01 to about 30 millimoles/liter of solvent of the organoaluminum compound (b).

5. The process of claim 1 wherein the reactions for forming the polymer composition are carried out in the further presence of an organic carboxylic acid ester.

6. An impact-resistant chemically blended propylene polymer composition having an ethylene content of 3 to 40 mole%, and consisting essentially of (A) 55 to 95% by weight of crystalline polypropylene containing 0 to 1 mole% of another olefin and having an isotactic index of at least 90, (B) 1 to 10% by weight of a low-crystalline propylene/ethylene copolymer containing 60 to 85 mole% of propylene, and (C) 1 to 35 mole% by weight of polyethylene or an ethylene/propylene copolymer containing up to 10 mole% of propylene which has an intrinsic viscosity of at least 2.6, the total proportion of (A), (B) and (C) being 100% by weight.

7. The impact-resistant chemically blended propylene polymer composition according to claim 6 consisting essentially of (A) 60 to 90% by weight of crystalline polypropylene containing 0 to 1 mole percent of another olefin and having an isotactic index of at least 90, (B) 2 to 8% by wieght of a low-crystalline propylene-/ethylene copolymer containing 60 to 85 mole% of propylene, and (C) 3 to 30 mole% by weight of polyethylene or an ethylene/propylene copolymer containing up to 10 mole% of propylene which has an intrinsic viscosity of at least 3, the total proportion of (A), (B) and (C) being 100% by weight.

8. The process for preparing an impact-resistant chemically blended propylene copolymer composition according to claim 1 wherein (1) the crystalline polypropylene of the first step accounts for 60 to 90% by weight of the final polymer composition;

(2) the content of propylene in the gaseous phase of the polymerization zone of the second step is maintained at 70 to 85 mole% and the low-crystalline propylene/ethylene copolymer has a propylene content of 65 to 80 mole% which accounts for 2 to 8% by weight of the final polymer composition; and (3) the content of propylene in the gaseous phase of the polymerization zone of the third step is maintained at 0 to 8 mole% and the polyethylene or ethylene/propylene copolymer has a propylene content of up to 8 mole% and has an intrinsic viscosity of at least 3, and accounts for 3 to 30% by weight of the final polymer composition.

* * * * *